BEST AVAILABLE COPY

UNITED STATES PATENT OFFICE.

GEORGE K. SMITH, OF WATERLOO, IOWA, ASSIGNOR, BY MESNE ASSIGNMENTS, OF ONE-HALF INTEREST TO GEORGE W. MILLER.

IMPROVEMENT IN COMPOSITION METALS FOR CASTING PLOWS.

Specification forming part of Letters Patent No. 143,539, dated October 7, 1873; reissue No 6,558, dated July 27, 1875; application filed October 30, 1874.

*To all whom it may concern:*

Be it known that I, GEORGE K. SMITH, of Waterloo, in the county of Black Hawk and State of Iowa, have invented an Improved Process of Making a Composition Metal, of which the following is a full, clear, and exact description:

This invention relates to the making of a composition metal designed to be used largely as a substitute for steel in the manufacture of plows and other agricultural implements, that require to wear bright and smooth in order to work easily; and my invention consists in making this composition metal by uniting together, in one homogeneous mass of uniform hardness and texture throughout, cast-iron and sheet or wrought iron, by first melting cast-iron that is to be used in making the composition metal, and pouring it upon a mass of unmelted steel or wrought-iron broken into small pieces, that is also to be used in making the composition, and then remelting this conglomerate mass, and casting it in any suitable molds or forms for use.

In using cast-iron and steel, or cast-iron and steel and wrought-iron, I melt or fuse the cast-iron by itself, and take the steel, or the steel and wrought-iron, as the case may be, and place them in a suitable receptable or bundle, to pour upon them the melted cast-iron, the cast-iron running among and surrounding the pieces of cold metal, making a conglomerate mass as the cast-iron is cooled. In order that the commingling of the melted iron with the unmelted wrought-iron or steel, or both, may be more complete, I ordinarily use the cold metal in scraps or broken in small pieces. This commingling of the melted cast-iron with the unmelted metal clearly chills the cast-iron, and has such an effect upon it and the unmelted metal that in remelting it all melts together, and constitutes a homogeneous compound or composition metal of uniform and even texture throughout. Its hardness or quality depends largely upon the comparative quantity of the different kinds of metal used in making the compound, and the comparative quantity of the different kinds of metal used depends upon the quality of the compound I desire to make, it being determined by the use I desire to make of the compound metal. To prepare metal for making plows, &c., I prefer to take thirty pounds of steel and thirty pounds of wrought-iron to about thirty-six pounds of ordinary cast-iron. The wrought-iron and steel is gathered in scraps, or broken in pieces of sufficient size to retain its shape and identity, and have sufficient body of metal to produce a chill, and the cast-iron melted and poured upon the cold metals surrounding and embodying these pieces, as above described. This conglomerate mass is then taken and remelted in a cupola, the same as if they were all cast-iron, and are cast into plows or other implements in the same manner. I have usually used, in making my composition metal, about four pounds of black oxide of manganese in each hundred pounds of the compound, which is placed among the steel and iron scraps. In this way wrought-iron and steel, or either of them, can be melted in a cupola with cast-iron, and when cast make a very fine-grained iron casting, exceedingly hard and durable, and capable of receiving a very high polish. Heretofore it has not been practicable to melt and commingle these different metals in a cupola, as they melt at different degrees of heat, and could not be made to commingle and unite and form a homogeneous compound or mixture. I use the manganese to use up the excess of carbon. The composition made in proportions above described can be annealed, so as to be drilled and worked under the hammer the same as ordinary malleable iron. When used for plow-points they can be sharpened the same as when made of steel, and can be hardened by the same process. It is a well-known fact that the soil in the different sections of the country produce different effects upon the implements and tools used for plowing and cultivating. In some sections of the country cast-iron plows will scour and wear bright and smooth; but in the western prairie-soil a cast-iron plow is virtually a failure, and steel plows have been used, which are very expensive, as they have to be wrought into shape. The plows made and cast from the composition as above described have proved a success in every way, and can be furnished at a cost but little above the ordinary cast-iron plows.

I am aware that it is not new to save cast-iron turnings, borings, and filings which are produced in an ordinary machine-shop. They have been utilized by pouring upon them melted iron, and then the mass remelted. The object of my invention is not to save any filings, &c., but to make a new kind of metal.

The object of pouring molten cast-iron upon cast-iron filings and borings or turnings was to effect in and by the blast or smelting furnace the melting and utilization of small masses of waste iron produced in the reduction of cast-iron by tools. The object of my invention is to produce a new metal by uniting, as above described, different kinds of metal. Pouring cast-iron in a molten state upon cast-iron does not change the character of the metal. The only result sought is to be able to melt the fine particles of cast-iron with cast-iron in a blast-furnace. I take metal that is broken into distinctive pieces of sufficient size to create a chill, and at the same time leave sufficient space between the pieces, when packed together, to allow the melted iron to flow in a considerable body between the pieces. These pieces should not be less than one-half an inch in thickness. The effect of pouring the molten cast-iron upon the mass of pieces of wrought-iron or steel is to produce a complete and perfect commingling of the different kinds of metal when the conglomerate is remelted, as above specified. My new metal is of a uniform quality and character throughout.

I claim—

1. The process of making a composition metal by first making a conglomerate by pouring melted cast-iron upon a mass of pieces of unmelted iron or steel of sufficient size to make a chill, and then remelting the conglomerate, as specified.

2. A composition metal consisting of steel, wrought-iron, cast-iron, and black oxide of manganese, substantially as specified.

GEORGE K. SMITH.

Witnesses:
JNO. E. RANDALL,
JAMES W. HOPKINS.